(12) United States Patent
Birdsong

(10) Patent No.: US 10,276,319 B1
(45) Date of Patent: Apr. 30, 2019

(54) SWITCH COVER GUARD

(71) Applicant: Howard Birdsong, Colorado Springs, CO (US)

(72) Inventor: Howard Birdsong, Colorado Springs, CO (US)

( * ) Notice: Subject to any disclaimer, the term of this patent is extended or adjusted under 35 U.S.C. 154(b) by 0 days.

(21) Appl. No.: 16/027,141

(22) Filed: Jul. 3, 2018

(51) Int. Cl.
*H01H 9/02* (2006.01)
*H02G 3/08* (2006.01)

(52) U.S. Cl.
CPC .............. *H01H 9/02* (2013.01); *H02G 3/081* (2013.01)

(58) Field of Classification Search
CPC ...... H01H 9/02; H01H 9/0264; H01R 13/639; H01R 13/6395; H02G 3/081; H02G 3/14
USPC ...... 174/66, 67; 220/241, 242, 345.1, 345.2, 220/345.3, 345.4, 345.5, 345.6, 476; 439/133, 134, 135, 136, 137, 149, 150
See application file for complete search history.

(56) References Cited

U.S. PATENT DOCUMENTS

| | | | | | |
|---|---|---|---|---|---|
| 2,516,464 | A | * | 7/1950 | Hooser | H01R 13/447 174/67 |
| 2,526,606 | A | * | 10/1950 | Gregg | H01R 13/447 174/67 |
| D267,226 | S | * | 12/1982 | Oster | D8/350 |
| 4,479,688 | A | * | 10/1984 | Jennings | H01R 13/6397 200/43.02 |
| 4,484,692 | A | * | 11/1984 | Palermo | H05K 5/0208 220/210 |
| 4,488,764 | A | * | 12/1984 | Pfenning | H01R 13/6397 439/133 |
| 4,810,833 | A | * | 3/1989 | Meyers | H02G 3/14 174/67 |
| 4,857,004 | A | * | 8/1989 | Poirier | H01R 13/447 439/140 |
| 4,968,856 | A | * | 11/1990 | Bowley | H01R 13/447 174/67 |
| 5,078,614 | A | * | 1/1992 | Shotey | H01R 13/447 174/67 |
| 5,934,919 | A | * | 8/1999 | Cross | H01R 13/6395 439/136 |
| 6,031,183 | A | * | 2/2000 | Guerrieri | H01R 13/447 174/67 |
| 7,097,474 | B1 | * | 8/2006 | Naylor | H01R 13/6397 174/67 |
| 7,284,995 | B1 | * | 10/2007 | Vail | H01R 13/447 439/133 |
| 9,865,406 | B2 | * | 1/2018 | Blakeman | H01H 3/02 |

* cited by examiner

*Primary Examiner* — Joshua E Rodden

(57) ABSTRACT

A switch cover guard for guarding at least one electrical device in an electrical plate against access, use and/or damage has a security chamber surrounded by first, second, top and bottom guard walls. The security chamber is open to the rear to allow electrical switches/outlets to be accessed from within the chamber once the rear of the switch cover guard is attached onto the electrical plate. A front security plate can be slid between an open position, which allows access to the switch/outlet, and a closed position. When closed, the security chamber is sealed and the switch/outlet is no longer accessible. An adhesive attachment layer can secure the guard directly to the switch/outlet plate without requiring the plate to be opened. The front security plate can have a transparent or translucent front panel to allow light to pass through while the switch cover guard is closed.

4 Claims, 7 Drawing Sheets

SWITCH COVER GUARD

TECHNICAL FIELD

The present invention relates generally to the field of electric switches and electrical outlets; and more particularly, to a switch cover guard that guards switches and/or outlets from unauthorized or inadvertent access and/or use.

BACKGROUND

Electrical wall switches and electrical wall outlets are common features that can be found in many modern homes and other buildings. Depending on the country in which it is found and the type of electrical system, a given system can utilize 120 volts or 240 volts of alternating current or 12 volts of direct current (other systems, although perhaps less common, are known and used throughout the world). Regardless of the voltage and type of current, it is often necessary to control access to the system: whether to enhance safety (e.g., discourage children from access), for security (e.g., to keep unauthorized persons from using the electrical system), or for other reasons (e.g., to ensure a particular light switch stays on all the time).

Although outlets are usually available for general purpose use, a given electrical switch is usually designed to control a particular light fixture, series of lights, or electrical circuit. Thus, although outlets often require limiting access for safety reasons, switches are more likely to need protection from inadvertent or unauthorized use.

A number of switch locks are known in the art. However, a common failing of such devices is that they require professional installation or at least the use of a screwdriver to remove the switch plate and/or it's securing screws. Non-professionals may not understand the need—or have the ability—to shut off the power to any electrical system before opening switch plates and/or outlet plates and exposing live or "hot" electrical wires. Thus, the present art, in an attempt to enhance safety, can actually cause harm. Another common failing of devices known in the art is that they can only be used on single switches: installing them on switch plates that have two, three or more switches is not possible. Additionally, the present art provides different devices to lock a switch and protect an outlet, instead of a single device that can handle both tasks. Many outlet covers known in the art have inert plastic prongs that are inserted into the outlet itself in order to "plug up" the outlet and protect it so that a child can't easily insert objects into the outlet. However, when an adult is ready to use such an outlet, the cover is removed and then can become easily lost as it is not otherwise attached to the outlet or outlet plate.

What is needed is a switch cover guard that can be used for a wide variety of switches and outlets both, that enhances safety without exposing the installer to live or "hot" wires during installation, that is affixed to the system so it can't be easily lost, that can be used in instances when multiple switches/outlets are closely spaced next to one another, and that guards switches and outlets from unauthorized or inadvertent access and/or use.

SUMMARY

A switch cover guard can comprise a security chamber defined by first and second guard walls on the sides and top and bottom guard walls connected thereto on the tops and bottoms thereof. The security chamber is open to the rear to allow a plethora of different kinds, types and styles of electrical switches to fit within the chamber once the switch cover guard is installed on a switch plate. The security chamber has a slidable front security plate and can be completely enclosed when the front security plate is slid into the closed position.

The front security plate can utilize a pull tab that has a plurality of actuation portions that allow an adult user to simply grasp the front security plate and slide it open so that the switch and/or outlet can be accessed/actuated. When finished, the user can slide the plate closed and the switch cover guard then ensures that no one inadvertently flips the switch or accesses the outlet.

The switch cover guard can utilize an adhesive attachment layer to securely attach the guard directly to the switch plate (or outlet plate). This is accomplished by simply removing the adhesive protection (see FIG. 5) from the adhesive attachment layer and pressing the switch cover guard firmly against the switch plate or outlet plate. This means of attachment assures that the user/installer does not need to expose any live or "hot" wires while also providing a secure and very strong fit between the switch cover guard and the underlying electrical plate to mitigate the possibility of accidental removal or breakage.

DETAILED DESCRIPTION OF THE DRAWINGS

Figure 1:
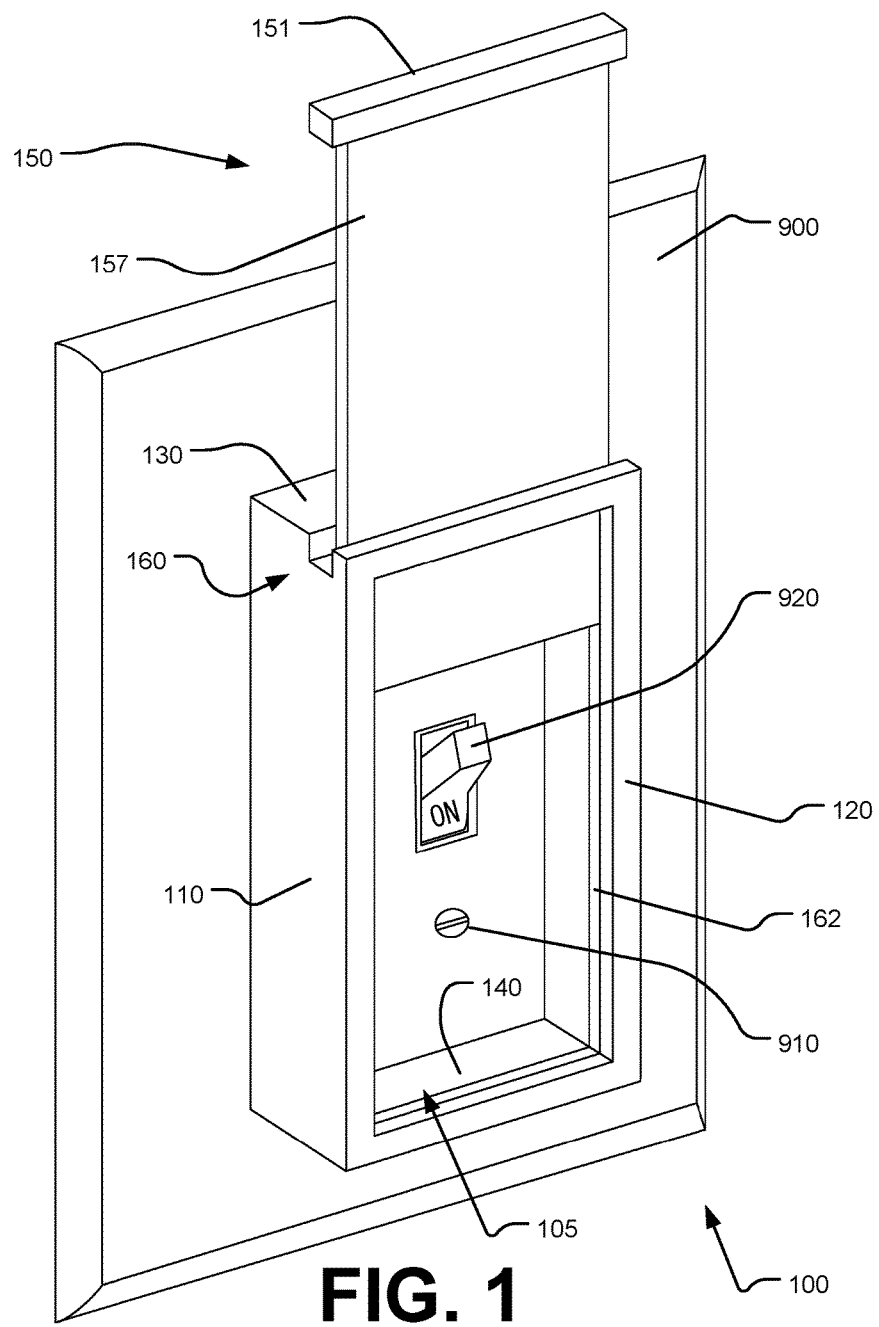
FIG. 1 illustrates a top and front perspective view of an exemplary embodiment of a switch cover guard installed on an exemplary wall light switch and with a front security plate slid partially open.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below and in the accompanying Figures. The following detailed description provides a review of the drawing Figures in order to provide a thorough understanding of, and an enabling description for, these embodiments. One having ordinary skill in the art will understand that in some cases well-known structures, methods and functions have not been shown or described in detail to avoid unnecessarily obscuring the description of the embodiments. The terms switch cover guard, security cover guard and security guard cover are used interchangeable to refer to the present invention.

Referring now to the drawings, FIG. 1 illustrates a top and front perspective view of an exemplary embodiment of a switch cover guard 100 installed on an exemplary wall light switch plate 900 and with a front security plate 150 slid partially open. The wall light switch comprises a switch plate 900 and a switch 920. Note that the switch cover guard 100 is attached to the switch plate 900 with the switch 920 positioned generally centered inside the rear opening of the security chamber 105 with the distal end of the switch (i.e., the end of the switch that people touch) being inside the security chamber 105.

The security chamber 105 contains the switch 920 when the switch cover guard 100 is installed on a switch plate. When installed on an outlet plate where the outlet does not extend outwards therefrom (or on a switch plate having a switch that does not extend outwards therefrom), the switch cover guard 100 may not contain the outlet or switch within the strict limits of the security chamber 105 itself, but rather, the security chamber provides access to the outlet or switch in such cases. The security chamber 105 is defined by the four chamber walls that make up its sides and top and bottom. The left and right sides of the security chamber 105 comprise the first and second guard walls 110 and 120, respectively. The first and second guard walls 110 and 120 extend generally vertically and are attached on their upper ends to the top guard wall 130 and on their lower ends to the bottom guard wall 140. At least two of the four guard walls have a security channel 162 therein along which the front security plate 150 slides in order for the front security plate 150 to open and close. In a preferred embodiment, at least the first guard wall and the second guard wall have the security channel 162. At least one of the guard walls 110, 120, 130 and 140 has a recessed actuation portion slot 160 within which a plurality of actuation portions 153 (not labeled in FIG. 1, see FIG. 4) and a remaining portion of the pull tab 151 of the front security plate 150 fit. In one embodiment, the actuation portions 153 fit flush with an outer surface of a guard wall (see FIG. 3) when the front security plate 150 is in a closed position. The actuation portions 153 provide the user with an easy place to grab the front security plate 150 so it can be slid in and out, while not providing a child with quick and easy access. Additionally, in other embodiments a lock or additional safety device can be attached to ensure that only an authorized user can actuate the front security plate 150 and access the switch/outlet.

The front security plate 150 comprises a security panel 157 that closes off the front of the security chamber 105 when the security plate 150 is in a closed position. When the security plate is moved to an open position, the security panel 157 is slid out of the way and creates a front opening to the security chamber 105, providing access to said chamber.

In FIG. 1 the switch 920 extends into the security chamber 105 of the switch cover guard 100 providing a user easy access to the switch once the front security plate 150 is opened. When a switch cover guard 100 is used on other types of switches and/or outlets, the switch/outlet may not extend as far into the strict limits of the security chamber 105, yet such a switch/outlet is still accessible through the security chamber 105 because of the design thereof. Note the screw 910 shown in FIG. 1 is one that can be found on most common switch plates 900 as it holds the switch plate in place over the switch and associated wiring (the wiring is hidden behind the switch plate in FIG. 1).

Figure 2:
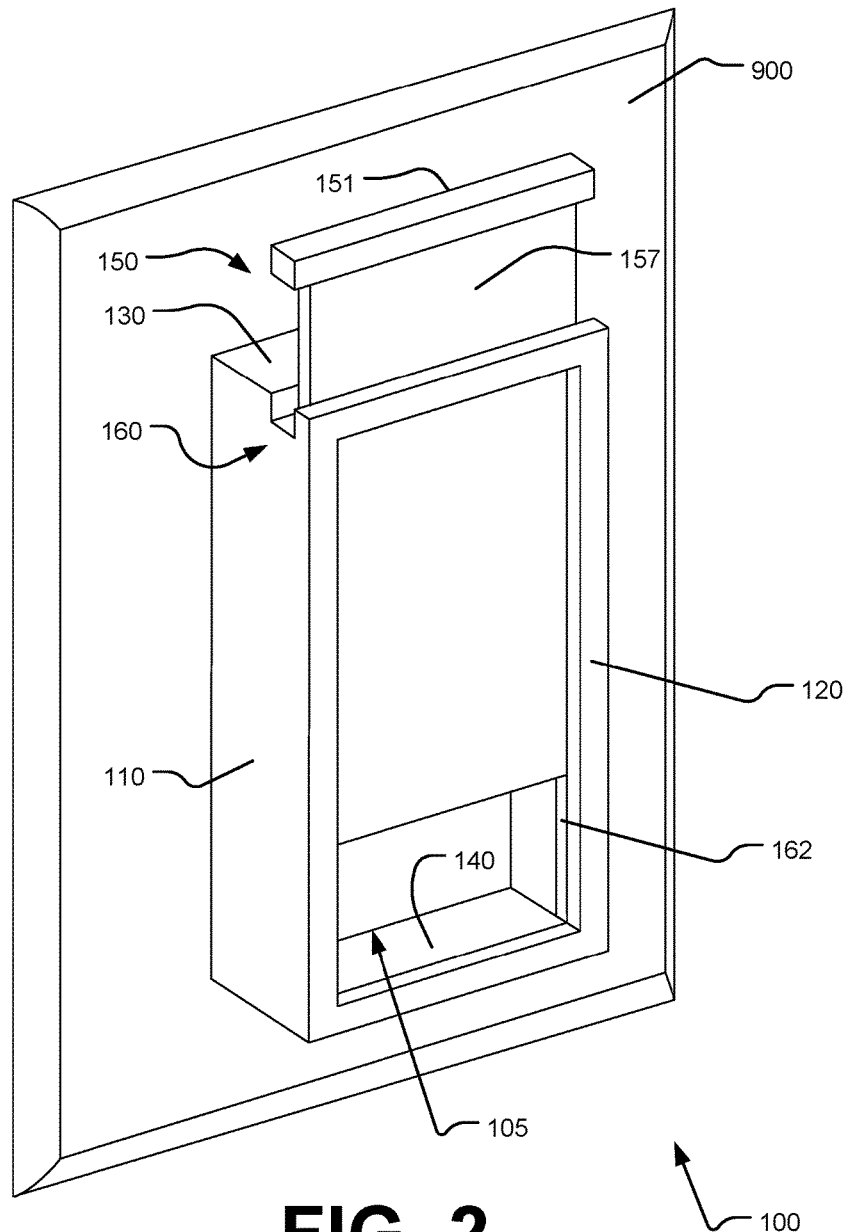
FIG. 2 illustrates a top and front perspective view of an exemplary embodiment of a switch cover guard installed on an exemplary wall light switch and with a front security plate slid mostly closed.

FIG. 2 illustrates a top and front perspective view of an exemplary embodiment of a switch cover guard 100 installed on an exemplary wall light switch plate 900 and with a front security plate 150 slid mostly closed. FIG. 2 is quite similar to FIG. 1 except that it shows the front security plate 150 slid further closed. Note the security channel 162 in which the front security plate 150 slides. In another embodiment, the security channel 162 extends not just along the inner surface of the first and second guard walls, but also along the inner surface of the bottom guard wall (see FIG. 1, for example).

Figure 3:
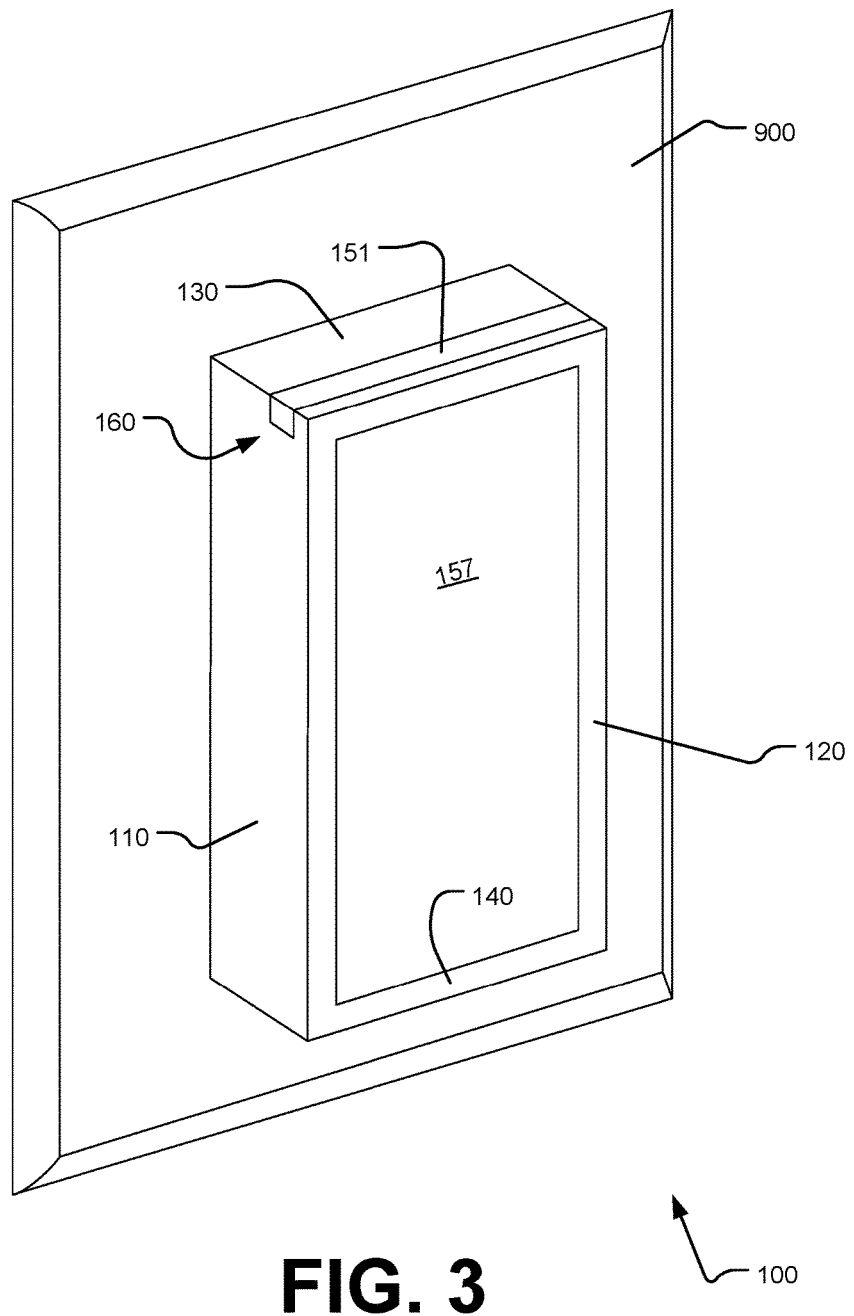
FIG. 3 illustrates a top and front perspective view of an exemplary embodiment of a switch cover guard installed on an exemplary wall light switch and with a front security plate slid closed.

FIG. 3 illustrates a top and front perspective view of an exemplary embodiment of a switch cover guard 100 installed on an exemplary wall light switch plate 900 and with a front security plate 150 slid closed. Note that FIG. 3 shows the pull tab 151 of the front security plate in a closed position, flush with the top surface of the top guard wall 130. The security panel 157 is in the completely closed position, thereby blocking access to the security chamber 105.

Figure 4:
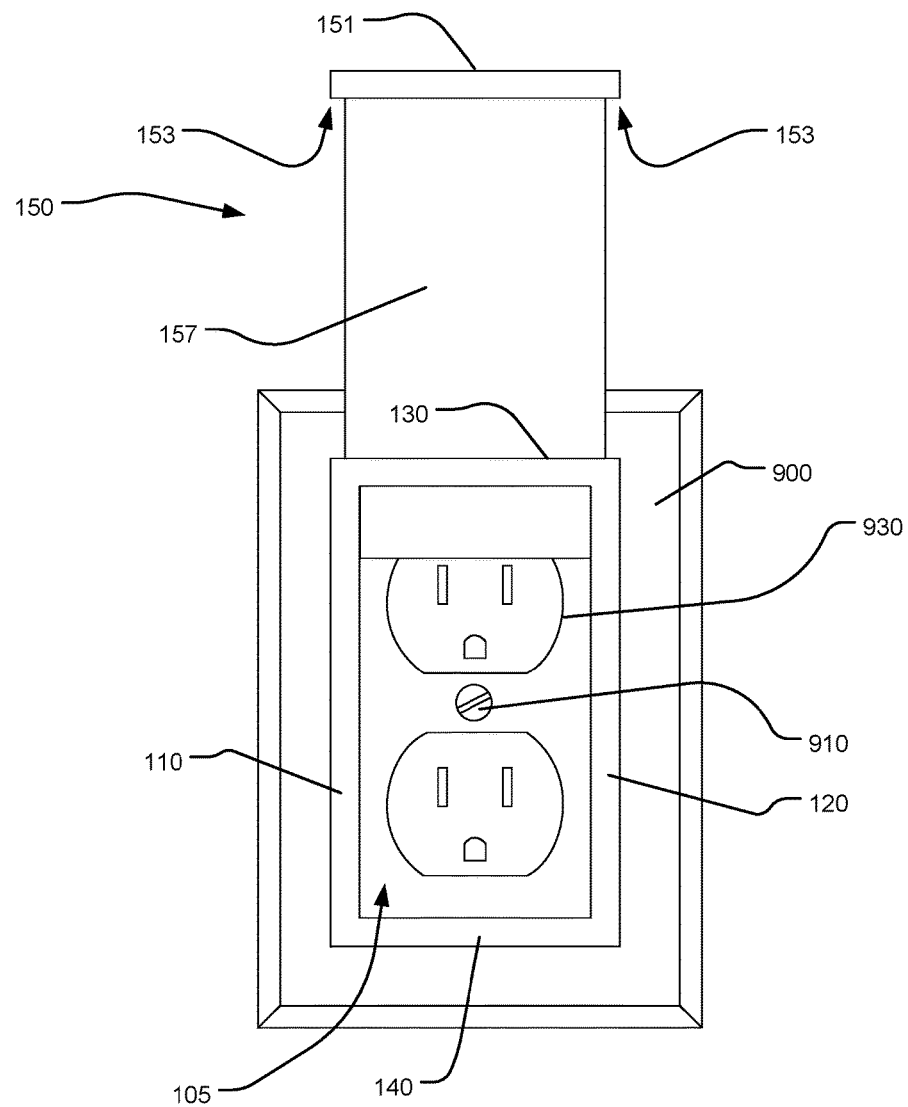
FIG. 4 illustrates a front elevation view of an exemplary embodiment of a switch cover guard installed on an exemplary wall outlet and with a front security plate slid partially open.

FIG. 4 illustrates a front elevation view of an exemplary embodiment of a switch cover guard 100 installed on an exemplary wall outlet plate 900 and with a front security plate 150 slid partially open. Note that instead of securing a switch, the security cover guard 100 of FIG. 4 is securing an outlet with receptacles 930. Similarly, the security cover guard 100 can be used with other types of switches and outlets simply by increasing or decreasing one or more relative dimensions. This is particularly useful when multiple outlets and/or multiple switches and/or multiple outlets and switches are arranged on an electrical plate in proximity too each other: in such a case, small/narrow switch cover guards 100 can be installed on individual switches/outlets to protect and secure multiple such electrical devices. Alternatively, an enlarged switch cover guard 100 can be installed over multiple switches/outlets allowing a single device to protect and secure multiple switches/outlets at once.

Figure 5:
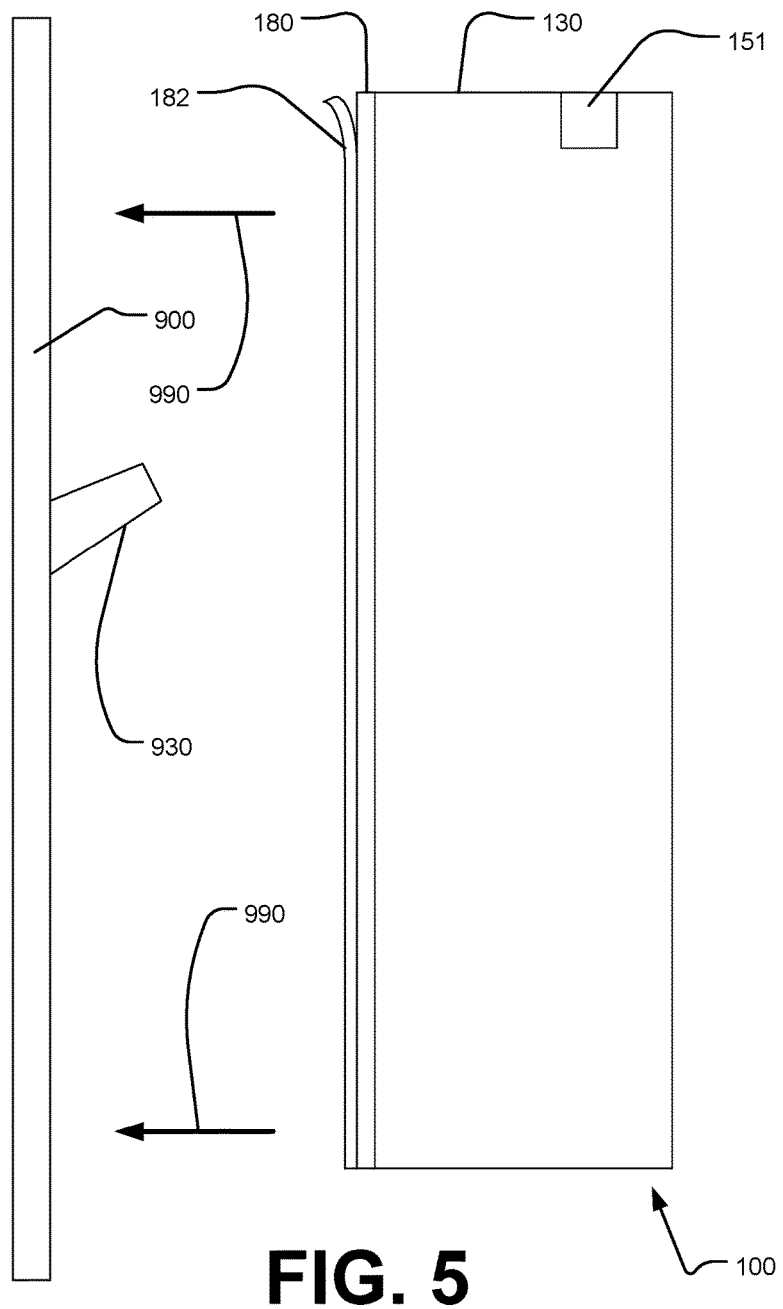
FIG. 5 illustrates a side elevation view of an exemplary embodiment of a switch cover guard about to be installed on an exemplary wall light switch and with a front security plate slid closed.

FIG. 5 illustrates a side elevation view of an exemplary embodiment of a switch cover guard 100 about to be installed on an exemplary wall light switch plate 900 and with a front security plate slid closed. In this view, an adhesive attachment layer 180 is shown affixed to the rear surface of the switch cover guard 100. In this particular embodiment, an adhesive protection layer 182 is illustrated protecting the adhesive attachment layer 180 prior to installation. To install, the user simply peels off the adhesive protection layer 182 and firmly presses the adhesive attachment layer 180 to the front surface of the electrical plate 900 (in the direction indicated by the arrows 990) with the switch generally centered in the security chamber. In other embodiments, other details of attachments are contemplated.

Figure 6:
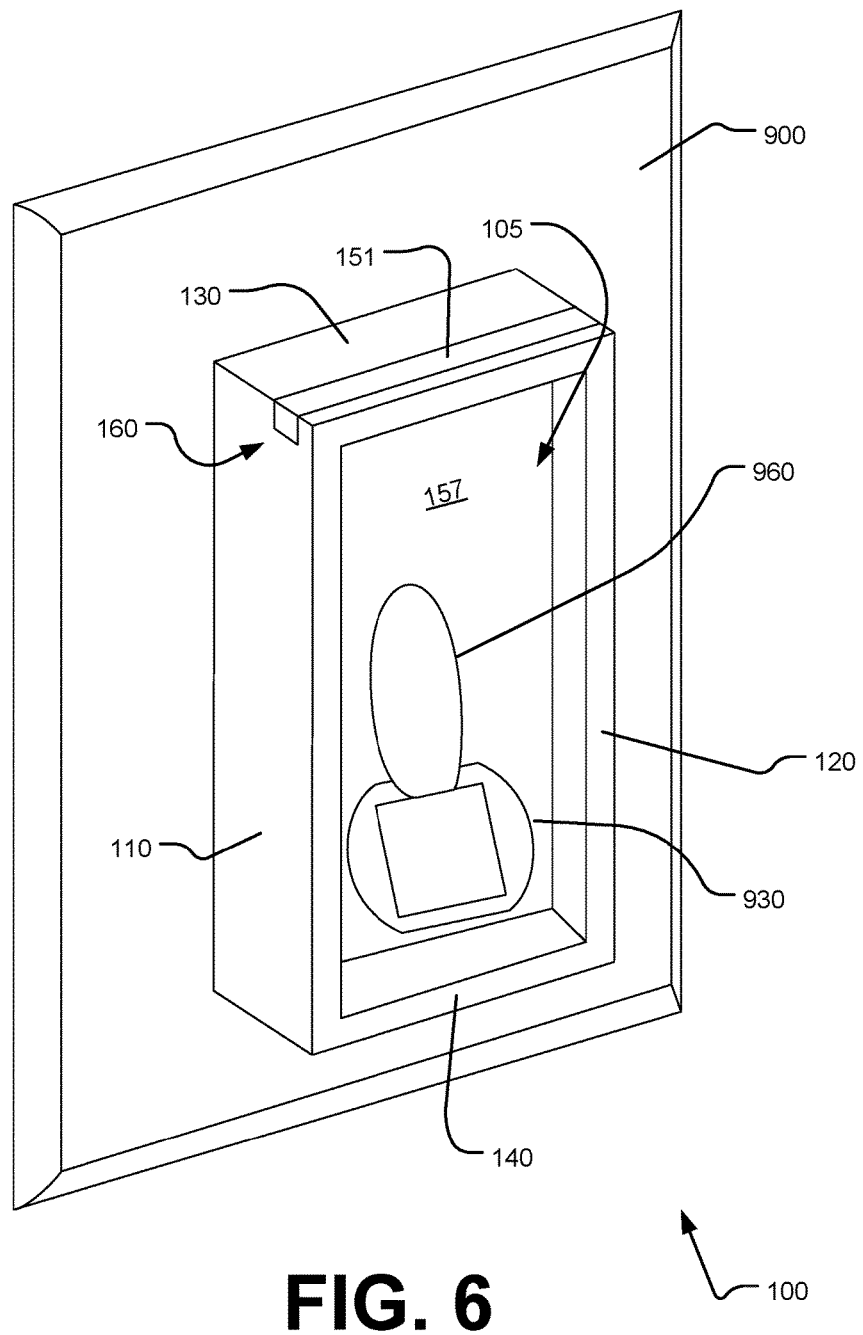
FIG. 6 illustrates a top and front perspective view of an exemplary embodiment of a switch cover guard installed on an exemplary wall outlet with a nightlight plugged in, and with a transparent front security plate slid closed.

FIG. 6 illustrates a top and front perspective view of an exemplary embodiment of a switch cover guard 100 installed on an exemplary wall outlet plate 900 with a nightlight 960 plugged into a receptacle of the outlet, and with a front security plate 150 slid closed. In this particular embodiment, the security panel 157 is illustrated as being transparent (or translucent) so that the outlet 930 and nightlight 960 are visible even though the front security plate 150 is in the closed position. This is a valuable feature for many reasons, including allowing a person to check on the status of a switch without having to open the switch cover guard (if it is used on a switch instead of an outlet, for example).

The embodiment in FIG. 6 allows an LED or other type of night light to be used (i.e., the nightlight shines out through the switch cover guard even with the guard closed) while the outlet is still made safe and protected so that the danger to a child is reduced. If an electrical device that produces too much heat for a completely enclosed security chamber 105 (such as the one shown in FIG. 6) is plugged into the outlet while the security chamber is closed, a plurality of vents, holes, or cooling ports (or a cooling device) can be incorporated into the security cover guard 100 to disperse the excess heat.

Figure 7:
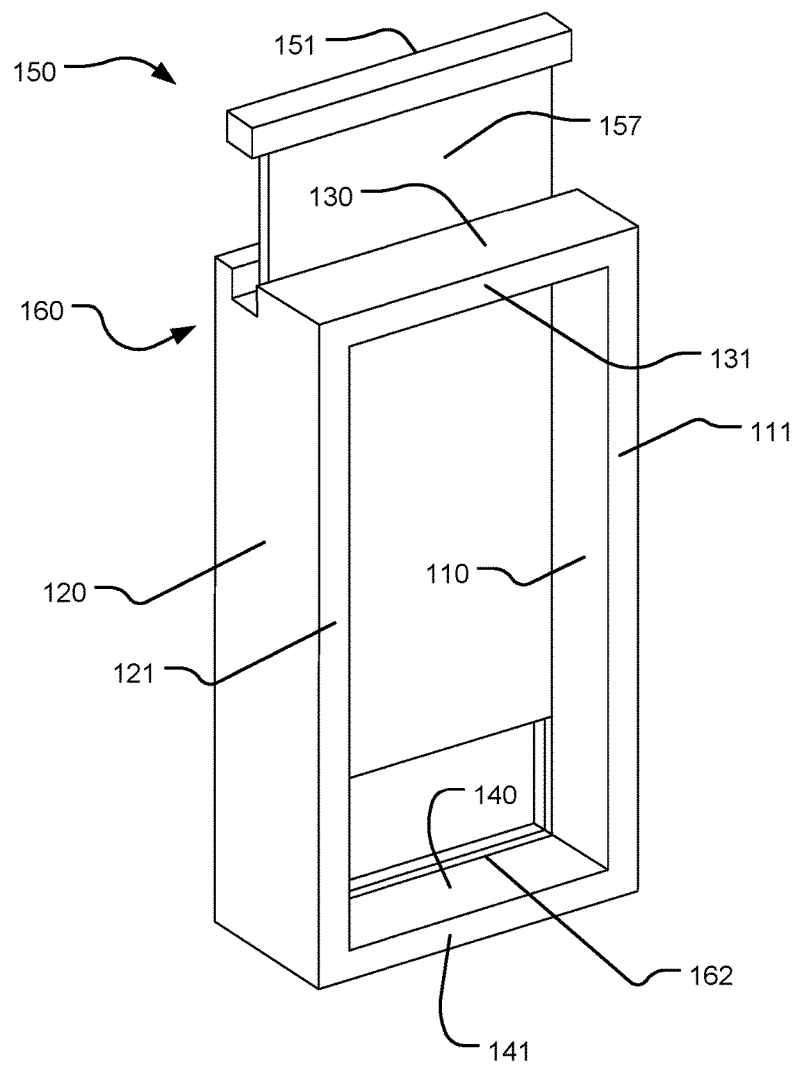
FIG. 7 illustrates a top and rear perspective view of an exemplary embodiment of a switch cover guard highlighting the rear surfaces of the guard walls.

FIG. 7 illustrates a top and rear perspective view of an exemplary embodiment of a switch cover guard 100 highlighting the rear edge surfaces of the guard walls 111, 121, 131 and 141. The top guard wall rear edge surface 131 is shown being approximately flush with the first guard wall rear edge surface 111 which is approximately flush with the second guard wall rear edge surface 121 which is approximately flush with the bottom guard wall rear edge surface 141. It is preferable that these guard wall rear edge surfaces are flush as they attach to the electrical plate 900 via the adhesive attachment layer 180 (see FIG. 5).

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, as well as those listed above, are incorporated herein by reference in their entirety. Aspects of embodiments can be modified, if necessary, to employ the systems, functions, and concepts of the various references to provide yet further embodiments.

In light of the above "Detailed Description," the inventor may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventor contemplate the various aspects in any number of claim forms. Accordingly, the inventor reserve the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

What is claimed is:

1. A security guard cover for guarding at least one electrical device in an electrical plate against access, comprising:

a first guard wall extending longitudinally from a first guard wall upper end to a first guard wall lower end;

a second guard wall extending longitudinally from a second guard wall upper end to a second guard wall lower end;

a top guard wall extending longitudinally from a top guard wall proximal end to a top guard wall distal end;

the top guard wall proximal end attached to the first guard wall upper end and the top guard wall distal end attached to the second guard wall upper end;

a bottom guard wall extending longitudinally from a bottom guard wall proximal end to a bottom guard wall distal end;

the bottom guard wall proximal end attached to the first guard wall lower end and the bottom guard wall distal end attached to the second guard wall lower end;

the first, second, top and bottom guard walls forming a four-sided box with an open rear and an open front;

a security chamber comprising a space between the first guard wall, second guard wall, top guard wall and bottom guard wall;

each guard wall having a rear edge surface and a front edge surface, with the rear edge surface having affixed thereto an adhesive attachment layer that affixes the rear edge surface to the electrical plate when the security guard cover is installed on the electrical plate;

when the security guard cover is installed on the electrical plate, the security chamber is positioned on the electrical plate such that the electrical device is accessible through the open rear;

a security channel extending longitudinally along an inner surface of the first guard wall and the second guard wall and defining thereby a track along which a front security plate slides between an open position wherein the security chamber is open to access by a user and a closed position wherein the security chamber is inaccessible;

the front security plate extends across the open front of the four-sided box when in the closed position;

the top guard wall has a recessed actuation portion slot within which a pull tab of the front security plate fits;

the pull tab comprises an upper center portion of the front security plate and has a plurality of pull tabs ends, and a plurality of actuation portions;

the actuation portion slot passes completely through the top guard wall and the front security plate is inserted through said actuation portion slot; and the plurality of actuation portions are accessible to the user and provide the user with a location to grasp the front security plate in order to actuate the front security plate by sliding the front security plate into the open position and into the closed position.

2. The security guard cover of claim 1, wherein the plurality of actuation portions fit flush with an outer surface of the top guard wall.

3. The security guard cover of claim 1, wherein the front security plate comprises a security panel that is transparent and light passes through the security panel even with the front security plate in a closed position.

4. The security guard cover of claim 2, wherein the front security plate comprises a security panel that is transparent and light passes through the security panel even with the front security plate in a closed position.

* * * * *